United States Patent Office 2,772,279
Patented Nov. 27, 1956

2,772,279

PREPARATION OF SULFENAMIDES

Richard Leshin, Akron, Ohio, assignor to The Goodyear Tire & Rubber Company, Akron, Ohio, a corporation of Ohio No Drawing. Application June 17, 1955,
Serial No. 516,306

11 Claims. (Cl. 260—306.6)

This invention relates to the manufacture of sulfenamides.

Various general methods of making sulfenamides have been suggested in the prior art. The most successful of the prior art methods involves the oxidative condensation of a mercaptan or a disulfide with an amine in aqueous alkaline medium using the alkali hypochlorites, the halogens such as chlorine or bromine, sodium ferricyanide and hydrogen peroxide as oxidizing agents. These reactants produce satisfactory yields of many sulfenamides, but it has been found that certain sulfenamides, especially certain sulfenamides derived from secondary amines, cannot be prepared in satisfactory yields by the methods of the prior art.

According to this invention, sulfenamide derivatives of secondary amines are prepared by reacting a mercaptothiazole or a thiazyldisulfide with a secondary amine and an organic hypochlorite oxidizing agent in the presence of an acid acceptor in an amount sufficient to absorb the hydrogen chloride formed from the hypochlorite.

When using a mercaptothiazole the reaction is believed to take place according to the following equation, in which 2-mercaptobenzothiazole, beta,beta'-iminodipro-

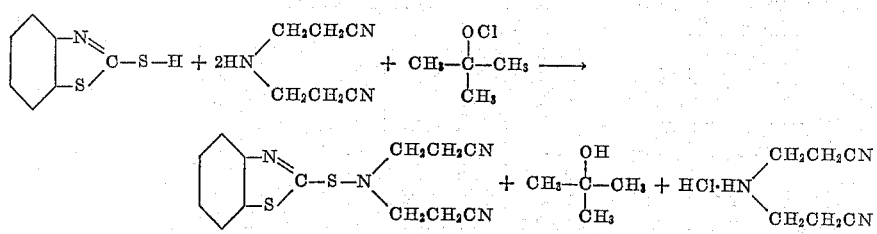

pionitrile and tertiarybutyl hypochlorite are used as illustrative starting materials.

When a thiazyldisulfide is used, the reaction is believed to proceed according to the following equation, using 2,2'-bis-benzothiazyldisulfide, beta,beta'-iminodipropioni-

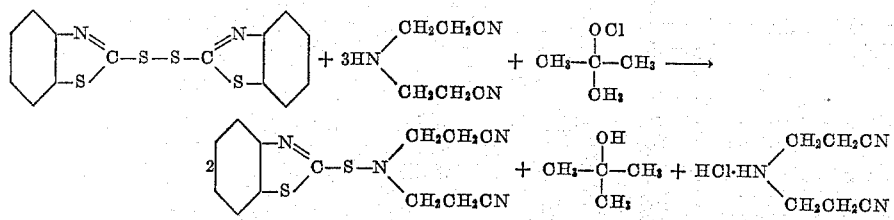

trile and tertiarybutyl hypochlorite as representative reactants.

The following examples are given to illustrate the practice of the invention.

Example A

Seventeen grams of 2-mercaptobenzothiazole, 60 grams of diisopropylamine and 100 milliliters of anhydrous methanol were placed in a small flask which was equipped with a stirrer and a reflux condenser. The mixture was brought to 45° C. and the temperature was maintained in the range of 40 to 45° C. The mixture was stirred while 15 grams of tertiarybutyl hypochlorite were slowly added. The mixture was then heated at 50° C. until all of the materials were dissolved and solution was complete. The solution was then cooled and diluted with water. The oily material which separated from the aqueous phase crystallized on further cooling. The product was filtered from the aqueous phase and washed with water. Twenty-five grams of product having a melting point range of 55 to 57° C. were obtained.

Example B

Thirty-four grams of 2,2'-bis-benzothiazyldisulfide, 54 grams of beta,beta'iminodipropionitrile and 100 milliliters of dioxane were placed in a small flask which was equipped with a stirrer and a reflux condenser. Twenty grams of tertiarybutyl hypochlorite dissolved in 50 milliliters of dioxane were slowly added while the mixture was being stirred. The temperature of the mixture was maintained at about 45° C. until all of the tertiarybutyl hypochlorite had been added. The mixture was then heated on a steam bath for a short time and was filtered while hot. The filtrate was cooled and diluted with water containing some crushed ice. The precipitate which formed was filtered off and dried. A yield of 55 grams (95.5% of the theoretical yield of sulfenamide) was obtained. The product melted at 107 to 109° C.

The examples illustrate the invention using dioxane and methanol as solvents, but other inert organic solvents which do not enter into the reaction can also be used. Representative examples of solvents that can be used in the practice of this invention are methanol, ethanol, isopropanol, normal propanol, the butanols, and dioxane.

Various mercaptothiazoles and thiazyldisulfides can be used in the practice of this invention. Representative examples of the 2-mercaptothiazoles are 2-mercaptothiazole, 4,5-dimethyl-2-mercaptothiazole, 4,5-diethyl-2-mercaptothiazole, 4-methyl-2-mercaptothiazole, 4-ethyl-2-mercaptothiazole, 4-butyl-2-mercaptothiazole, 5-ethyl-2-mercaptothiazole; and 2-mercaptoarylthiazoles such as 2-mercaptobenzothiazole, 6 - chloro-2 - mercaptobenzothiazole, 4 - ethoxy - 2 - mercaptobenzothiazole, 6-phenyl-2-mercaptobenzothiazole, 6-nitro-2-mercaptobenzothiazole, 4-methyl-2-mercaptobenzothiazole, 5-ethyl-2-mercaptobenzothiazole, 6-tertiarybutyl-2-mercaptobenzothiazole and the 2-mercaptonaphthothiazoles. Representative examples of the thiazyldisulfides are 2,2'-bis-thiazyldisulfide, 2,2'-bis(4-methyl-thiazyl)disulfide, 2,2'-bis(4-ethyl-thiazyl)disulfide, 2,2'-bis(4-butyl-thiazyl)disulfide, 2,2'-bis(5-ethyl-thiazyl)disulfide, and the arylthiazyldisulfides such as 2,2'-bis-benzothiazyldisulfide, 2,2'-bis(6-chlorobenzothiazyl)disulfide, 2,2'-bis(4-ethoxybenzothiazyl)disulfide, 2,2'-bis(6-phenylbenzothiazyl)disulfide, 2,2'-bis(6-nitrobenzothiazyl)-disulfide, 2,2'-bis(6-methylbenzothiazyl)disulfide, 2,2'-bis(5-ethylbenzothiazyl)disulfide, 2,2'-bis(6-tertiary-butylbenzothiazyl)disulfide and the 2,2'-bis-naphthothiazyldisulfides.

The examples show the process of the invention using diisopropylamine and beta,beta'-iminodipropionitrile as the secondary amine. Sulfenamide derivatives of other secondary amines can also be made by the process of the invention, the invention being applicable to secondary amines of the general formula $$\begin{array}{c} R_1 \\ \diagdown \\ NH \\ \diagup \\ R_2 \end{array}$$

in which $R_1$ and $R_2$ are selected from the group consisting of alkyl radicals, aralkyl radicals, alicyclic radicals, furfuryl, tetrafurfuryl and radicals in which $R_1$ and $R_2$ are joined to form a cycloaliphatic ring. Representative examples of such amines are aliphatic amines such as dimethylamine, diethylamine, di-n-propylamine, diisopropylamine, di-n-butylamine, methylethylamine, methylpropylamine, beta-methyliminopropionitrile, beta-isopropylyiminopropionitrile; mixed aliphatic-cycloaliphatic amines such as methylcyclohexylamine, ethylcyclohexylamine; alkyl aralkylamines such as methylbenzylamine, ethylbenzylamine; diaralkylamines such as dibenzylamine; dicycloalkylamines such as dicyclohexylamine; difurfurylamine; ditetrahydrofurfurylamine; and cycloaliphatic-amines such as piperidine, morpholine, thiomorpholine, and piperazine. In addition to amines containing the parent hydrocarbon radicals it is also possible to use amines containing substituted radicals in which the substituents do not themselves enter into the reaction or interfere with its normal course.

The invention has also been illustrated with particular respect to the use of tertiarybutyl hypochlorite as the oxidizing agent. Other tertiaryalkyl hypochlorites such as tertiaryamyl hypochlorite and tertiaryoctyl hypochlorite can be used.

The temperature at which the reaction is carried out is not critical, but it is desirable to use a temperature that is high enough to give a practical rate of reaction and low enough to avoid decomposition of the product. Accordingly, lower or higher temperatures can be used but the reaction time must then be adjusted accordingly. The reaction may be carried out at sub-atmospheric pressure or super-atmospheric pressure if desired, but it proceeds at a practical rate and without difficulty at atmospheric pressure.

When the mercaptothiazole is used as the starting material the reactants are most efficiently used in the ratio of one mol. of the mercaptothiazole to one mol. of the secondary amine to at least one mol of hypochlorite in the presence of an amount of an acid acceptor sufficient to absorb the hydrogen chloride formed in the reaction. When the thiazyldisulfide is used as the starting material the reactants are most efficiently used in the ratio of one mol. of the thiazyldisulfide to two mols. of the secondary amine to at least one mol. of the hypochlorite in the presence of an amount of an acid acceptor sufficient to absorb the hydrogen chloride formed in the reaction. In either case the acceptor can be the same amine or a different amine such as a tertiary amine which does not react to form a sulfenamide or a different secondary amine, in which case a mixture of the different sulfenamides may be formed. While the hypochlorite can be used in the amount theoretically required to oxidize the thiazole or thiazyldisulfide and the amine to the sulfenamide, generally about a ten percent excess is used. It is preferred to have the amine or acid acceptor such as pyridine or other tertiary amine present in amount sufficient to react with the hydrogen chloride released to maintain the system in a neutral or alkaline state. When an excess of the amine is used as the acid acceptor, it is preferred to use one mol. of mercaptothiazole to at least two and preferably from two to four mols. of the secondary amine to at least one mol. of the hypochlorite or one mol. of the thiazyldisulfide to at least three and preferably from three to four mols. of the secondary amine to at least one mol. of the hypochlorite.

The products can be purified by a method other than crystallization if desired.

While certain representative embodiments and details have been shown for the purpose of illustrating the invention, it will be apparent to those skilled in this art that various changes and modifications may be made therein without departing from the spirit or scope of the invention.

I claim:

1. The process of manufacturing thiazolesulfenamides which comprises reacting in an inert organic solvent a secondary amine of the general formula

$$\begin{array}{c} R_1 \\ \diagdown \\ NH \\ \diagup \\ R_2 \end{array}$$

in which $R_1$ and $R_2$ are selected from the group consisting of alkyl, aralkyl, alicyclic, furfuryl, and tetrahydrofurfuryl radicals and radicals in which $R_1$ and $R_2$ are joined to form a cycloaliphatic ring and a compound selected from the group consisting of 2-mercaptothiazoles and 2,2'-bis-thiazyldisulfides in the presence of a tertiary organic hypochlorite.

2. The process of claim 1 in which the 2-mercaptothiazole is a 2-mercaptobenzothiazole.

3. The process of claim 1 in which the 2,2'-bis-thiazyldisulfide is a 2,2'-bis-benzothiazyldisulfide.

4. The process of preparing N,N-dibetacyanoethyl-2-benzothiazolesulfenamide which comprises reacting in an inert organic solvent at least 3 mols. of beta,beta'-iminodipropionitrile, 1 mol. of 2,2'-bis-benzothiazyldisulfide, and at least 1 mol. of tertiarybutyl hypochlorite.

5. The process of preparing N,N-dibetacyanoethyl-2-benzothiazolesulfenamide which comprises reacting in an inert organic solvent 1 mol. of 2-mercaptobenzothiazole, at least 2 mols. of beta,beta'-iminodipropionitrile and 1 mol. of tertiarybutyl hypochlorite.

6. The process of preparing N,N-diethyl-2-benzothiazolesulfenamide which comprises reacting in an inert organic solvent 1 mol. of 2-mercaptobenzothiazole, at least 2 mols. of diethylamine and 1 mol. of tertiarybutyl hypochlorite.

7. The process of preparing N,N-di(n-propyl)-2-benzothiazolesulfenamide which comprises reacting in an inert organic solvent 1 mol. of 2-mercaptobenzothiazole, at least 2 mols. of di(n-propyl)amine and 1 mol. of tertiarybutyl hypochlorite.

8. The process of preparing N,N-diisopropyl-2-benzothiazolesulfenamide which comprises reacting in an inert organic solvent 1 mol. of 2-mercaptobenzothiazole, at least 2 mols of diisopropylamine, and 1 mol. of tertiarybutyl hypochlorite.

9. The process of preparing N,N-di(n-butyl)-2-benzothiazolesulfenamide which comprises reacting in an inert organic solvent 1 mol. of 2-mercaptobenzothiazole, at least 2 mols. of di(n-butyl)amine, and 1 mol. of tertiarybutyl hypochlorite.

10. The process of preparing N,N-dicyclohexyl-2- benzothiazolesulfenamide which comprises reacting in an inert organic solvent at least 3 mols. of dicyclohexylamine, 1 mol. of 2,2'-bis-benzothiazyldisulfide and 1 mol. of tertiarybutyl hypochlorite.

11. The process of preparing N,N-dicyclohexyl-2-benzothiazolesulfenamide which comprises reacting in an inert organic solvent at least 2 mols. of dicyclohexylamine, 1 mol. of 2-mercaptobenzothiazole and 1 mol. of tertiarybutyl hypochlorite.

References Cited in the file of this patent

UNITED STATES PATENTS

| 2,045,888 | Tschunkur et al. | June 30, 1936 |
| 2,393,500 | Carr | Jan. 22, 1946 |
| 2,585,155 | Mingasson | Feb. 12, 1952 |

OTHER REFERENCES

Kenner: Chem. Abst., vol. 40, pp. 269–70 (1946).